(12) United States Patent
Kondapalli

(10) Patent No.: US 9,013,999 B1
(45) Date of Patent: Apr. 21, 2015

(54) METHOD AND APPARATUS FOR EGRESS JITTER PACER

(75) Inventor: Raghu Kondapalli, San Jose, CA (US)

(73) Assignee: Marvell International Ltd., Hamilton (BM)

(*) Notice: Subject to any disclaimer, the term of this patent is extended or adjusted under 35 U.S.C. 154(b) by 1231 days.

(21) Appl. No.: 12/329,088

(22) Filed: Dec. 5, 2008

Related U.S. Application Data

(60) Provisional application No. 61/018,530, filed on Jan. 2, 2008.

(51) Int. Cl.
*G01R 31/08* (2006.01)
*H04L 12/26* (2006.01)

(52) U.S. Cl.
CPC .................... *H04L 12/2657* (2013.01)

(58) Field of Classification Search
None
See application file for complete search history.

(56) References Cited

U.S. PATENT DOCUMENTS

| | | | | |
|---|---|---|---|---|
| 5,497,371 A * | 3/1996 | Ellis et al. | | 370/412 |
| 6,925,055 B1 * | 8/2005 | Erimli et al. | | 370/229 |
| 7,292,530 B2 * | 11/2007 | Christensen | | 370/230.1 |
| 7,385,987 B1 * | 6/2008 | Charny et al. | | 370/395.4 |
| 7,602,809 B2 * | 10/2009 | Henriques | | 370/471 |
| 2001/0033581 A1 * | 10/2001 | Kawarai et al. | | 370/468 |
| 2002/0114277 A1 * | 8/2002 | Kyusojin | | 370/230.1 |
| 2002/0122387 A1 * | 9/2002 | Ni | | 370/231 |
| 2002/0136217 A1 * | 9/2002 | Christensen | | 370/393 |
| 2002/0136230 A1 * | 9/2002 | Dell et al. | | 370/416 |
| 2002/0136233 A1 * | 9/2002 | Chen et al. | | 370/445 |
| 2002/0191622 A1 * | 12/2002 | Zdan | | 370/401 |
| 2003/0115310 A1 * | 6/2003 | Klotsche | | 709/223 |
| 2003/0189940 A1 * | 10/2003 | Greenblat | | 370/406 |
| 2004/0141528 A1 * | 7/2004 | LeBlanc et al. | | 370/508 |
| 2004/0156354 A1 * | 8/2004 | Wang et al. | | 370/352 |
| 2004/0210619 A1 * | 10/2004 | Balachandran et al. | | 709/200 |
| 2004/0258090 A1 * | 12/2004 | Sharafeddine et al. | | 370/468 |
| 2005/0068798 A1 * | 3/2005 | Lee et al. | | 365/49 |
| 2005/0226156 A1 * | 10/2005 | Keating et al. | | 370/235 |
| 2006/0029065 A1 * | 2/2006 | Fellman | | 370/389 |
| 2007/0195761 A1 * | 8/2007 | Tatar et al. | | 370/389 |
| 2007/0248082 A1 * | 10/2007 | Nielsen | | 370/360 |
| 2007/0297435 A1 * | 12/2007 | Bucknell et al. | | 370/412 |
| 2009/0141631 A1 * | 6/2009 | Kim et al. | | 370/235 |
| 2010/0046373 A1 * | 2/2010 | Smith et al. | | 370/235.1 |

* cited by examiner

*Primary Examiner* — Marsha D Banks Harold
*Assistant Examiner* — Hoonman Houshmand

(57) ABSTRACT

Aspects of the disclosure provide a device transmitting a sequence of packets. The device may include a first queue configured to queue the sequence of packets for transmission by an egress port to a receiving device, and a queue control module configured to transmit the sequence of packets in time slots of the egress port. The sequence of packets can be uniformly distributed across the time slots to satisfy an agreed data rate between the device and the receiving device.

27 Claims, 7 Drawing Sheets

METHOD AND APPARATUS FOR EGRESS JITTER PACER

INCORPORATION BY REFERENCE

This application claims the benefit of U.S. Provisional Application No. 61/018,530, "Method and Apparatus for Egress Jitter Pacer for Media Sources" filed on Jan. 2, 2008, which is incorporated herein by reference in its entirety.

BACKGROUND

A media device may transmit media data to a receiving device via a network. The media data can be transmitted in the form of a sequence of packets. Each packet in the sequence can hop from one network node to another network node in a manner that is relatively independent of other packets in the sequence. Therefore, the packets in the sequence may experience different network delays. The different network delays may result in un-predicable arrival time at the receiving device, which may cause discontinuity when the receiving device plays the media data.

In a technique to improve the playing quality, the receiving device may use a large memory to buffer a large amount of packets to ensure playing continuity. Such technique may raise hardware requirement, and increase hardware cost.

SUMMARY

Aspects of the disclosure can provide methods and apparatuses for transmitting a sequence of packets. The methods and apparatuses may distribute packets in time slots uniformly according to an agreed data rate between a media source device and a media receiving device.

According to the disclosure, a device for transmitting a sequence of packets may include a first queue configured to queue the sequence of packets for transmission from an egress port to a receiving device, and a queue control module configured to schedule the sequence of packets in time slots of the egress port. The packets are included in the time slots of the egress port, such that the packets are uniformly distributed across the time slots, and transmission of the sequence of packets satisfies an agreed data rate between the device and the receiving device.

Further, the device may include a second queue configured to queue at least one packet. The queue control module can be further configured to schedule a packet from the first queue before a packet from the second queue for transmission in a time slot of the egress port in order to ensure the packet from the first queue being transmitted in the time slot.

Additionally, the queue control module can further shape the transmission rate from the first queue based on an agreed transmission profile.

The device may include a token bucket to determine a time for a packet transmission. The token bucket can store a number of tokens. Then, the queue control module can be further configured to update the number of tokens in the token bucket based on the agreed data rate. Further, the queue control module can be further configured to determine the packet transmission from the first queue based on comparing the number of tokens in the token bucket to a token limit. The queue control module may increase the number of tokens by a token rate. Thus, the queue control module may determine the time when the number of tokens are larger than the token limit. In addition, when a packet is transmitted, a number of tokens corresponding to a size of the packet can be subtracted from the token bucket.

According to the disclosure, the device and the receiving device can be included in a network media system. The network media system may further include a network communication channel that couples the device and the receiving device together. The device may provide media data. The communication channel can transmit the media data from the device to the receiving device. Then, the receiving device can play the media data.

Aspects of the disclosure may also provide a pacing method for outputting a sequence of packets. The pacing method may include queuing a sequence of packets into a first queue for transmission from an egress port to a receiving device and scheduling the sequence of packets in time slots of the egress port. The sequence of packets can be uniformly distributed across the time slots, and transmission of the sequence of packets satisfies an agreed data rate between a media source and the receiving device.

Additionally, the pacing method may include queuing at least one packet into a second queue for transmission from the egress port, and scheduling a packet from the first queue before a packet from the second queue for transmission in a time slot of the egress port in order to ensure the packet from the first queue is transmitted in the time slot.

Additionally, aspects of the disclosure can provide a device for packet transmission. The device can include a first queue with a first transmission profile, a second queue with a second transmission profile, and a queue control module configured to schedule respective packets from the first queue and the second queue for transmission from an egress port. The queue control module may check the first transmission profile of the first queue before a packet from the second queue is scheduled for transmission.

Further, aspects of the disclosure can provide a pacing method for outputting a sequence of packets. The pacing method can include queuing packets into a first queue with a first transmission profile, queuing at least one packet into a second queue with a second transmission profile, scheduling packets transmission from the first queue and the second queue, and checking the first transmission profile of the first queue before a packet from the second queue is scheduled for transmission.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
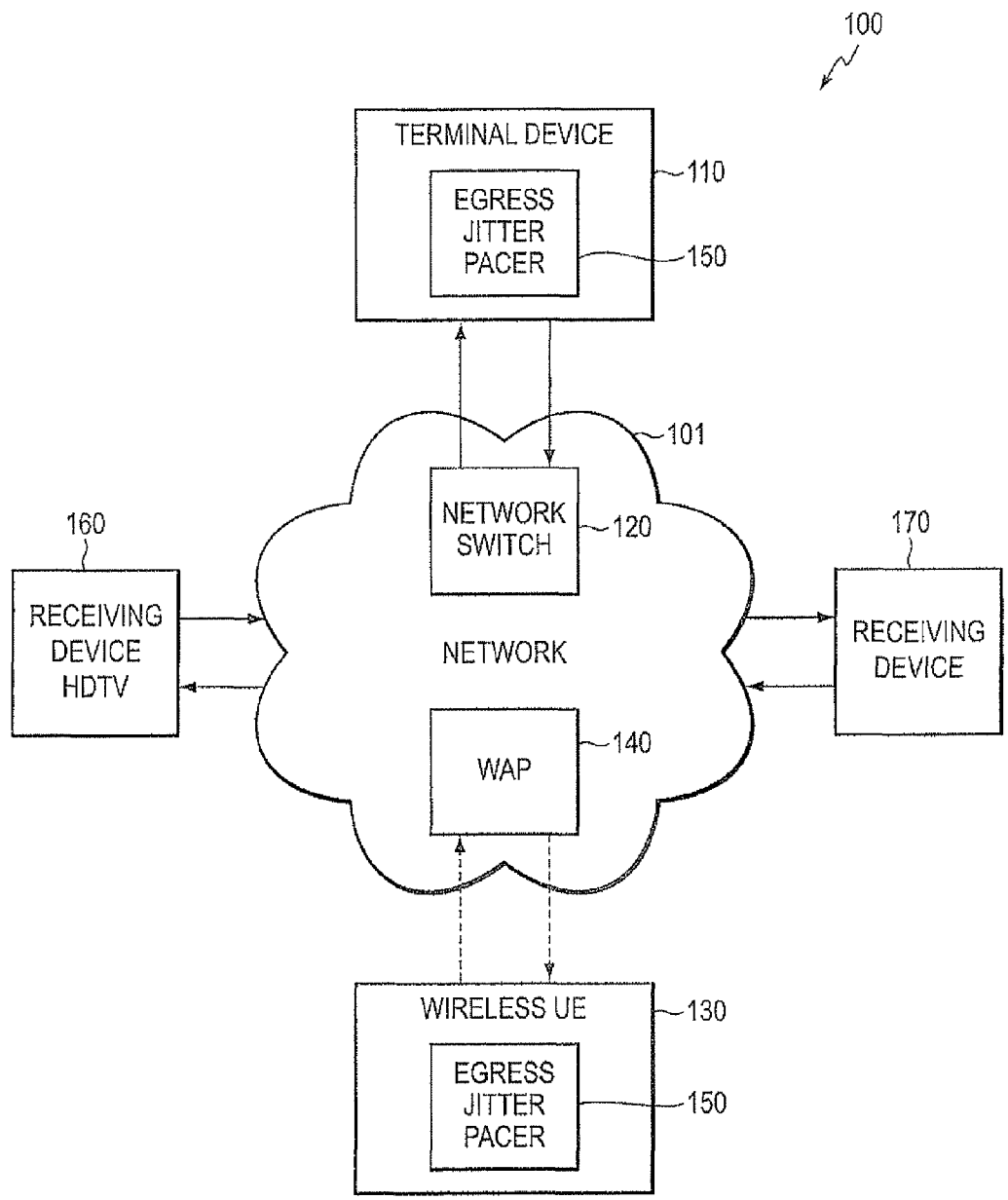
FIG. 1 shows a block diagram of an exemplary network configuration according to the disclosure.

FIG. 1 shows a block diagram of an exemplary network configuration. The network configuration 100 may include various media source devices, such as a terminal device 110, a wireless user equipment 130, and the like, coupled to a network 101. Additionally, the network configuration 100 may include receiving devices, such as receiving devices 160 and 170 in FIG. 1, coupled to the network 101. The media source devices can utilize the network 101 to transmit a media stream to the receiving devices for playing.

The network 101 can be wired, wireless, a local area network (LAN), a wide area network (WAN), a peer-to-peer network, the Internet, etc. or any combination of these that interconnects a media source device to at least one receiving device. The media source device can be coupled to the network 101 via a communication link. The communication link can be any type of wired or wireless link, including, but not limited to, multiple twisted pair cables, DSL, coaxial cable, fiber optics, RF cable modems, over-the-air frequency, over-the-air optical wavelength (e.g. infrared), local area networks, wide area networks, intranets, internet, virtual private networks, cable TV, terrestrial broadcast radio or television, satellite transmission, simple direct serial/parallel wired connections, or the like, or combinations of these.

In the example of FIG. 1, the terminal device 110, which may be a media server, can be coupled to the network 101 via a wired connection, such as via a network switch 120. The wireless user equipment 130, which may be a WiFi enabled laptop computer, can be coupled to the network 101 via a wireless connection, such as via a wireless access point (WAP) 140.

The media source devices can transmit media data to the receiving devices in the form of a sequence of packets. For example, the terminal device 110 may transmit a digital movie in the form of a sequence of packets. The packets in the sequence may hop from one node of the network 101 to another node of the network 101, and can be received by a receiving device, such as the receiving device 160 which may be a HDTV, coupled to the network 101. Then, the HDTV 160 can play the digital movie based on the received packets.

In another example, the wireless user equipment 130 may include a video camera component and a microphone component that can enable a video conference. During the video conference, the video camera component and the microphone component may capture image and sound in real time. Further, the wireless user equipment 130 may include components, such as an encoder module, that can generate a digital video/audio stream based on the captured image and sound, and can packetize the digital video/audio stream into a sequence of packets. Then, the sequence of packets can be transmitted via the WiFi interface of the wireless user equipment 130, for example. The sequence of packets can be received by the WAP 140, and transmitted to a receiving device, such as the receiving device 170 which can be located at another side of the video conference, coupled to the network 101. The receiving device 170 can then recover the digital video/audio stream based on the received packets and play the digital video/audio stream in real time, for example.

It is noted that a media source device can include components that can enable the media source device to receive and play media data as well. For example, the wireless user equipment 130 may receive a sequence of packets from its WiFi interface. The sequence of packets may be generated and transmitted from another side of the video conference. The wireless user equipment 130 may include components that can recover a digital video/audio stream based on the received packets, and play the digital video/audio stream, for example.

According to the disclosure, a media source device, such as the terminal device 110 and the wireless user equipment 130, may include an egress jitter pacer 150 that can schedule packet transmission for a media stream based on a requested bandwidth, an agreed data rate between a media source and a media listener, or requested data rate of the media stream. More specifically, the egress jitter pacer 150 may reserve hardware for the media stream to ensure transmitting the media stream at a rate, for example bytes per transmission interval, in various traffic conditions.

Generally, a media stream may utilize a minimal bandwidth for transmission. For example, a media stream for video conference may require about 0.384 Mbps, and a media stream for HDTV may require about 12-20 Mbps depending on, for example resolution, compression rate, and the like. On the other hand, the receiving device may also require a data rate to ensure playing continuity.

According to the disclosure, a media stream may be packetized into a sequence of packets, for example by an encoder. The sequence of packets can be scheduled for transmission from the media source device to the receiving device by the egress jitter pacer 150. The egress jitter pacer 150 may schedule the sequence of packets in time slots of an egress port. The sequence of packets can be included in the time slots of the egress port, such that the packets are uniformly distributed across the time slots and the sequence of packets can satisfy the bandwidth, or the required data rate of the receiving device.

Figure 2:
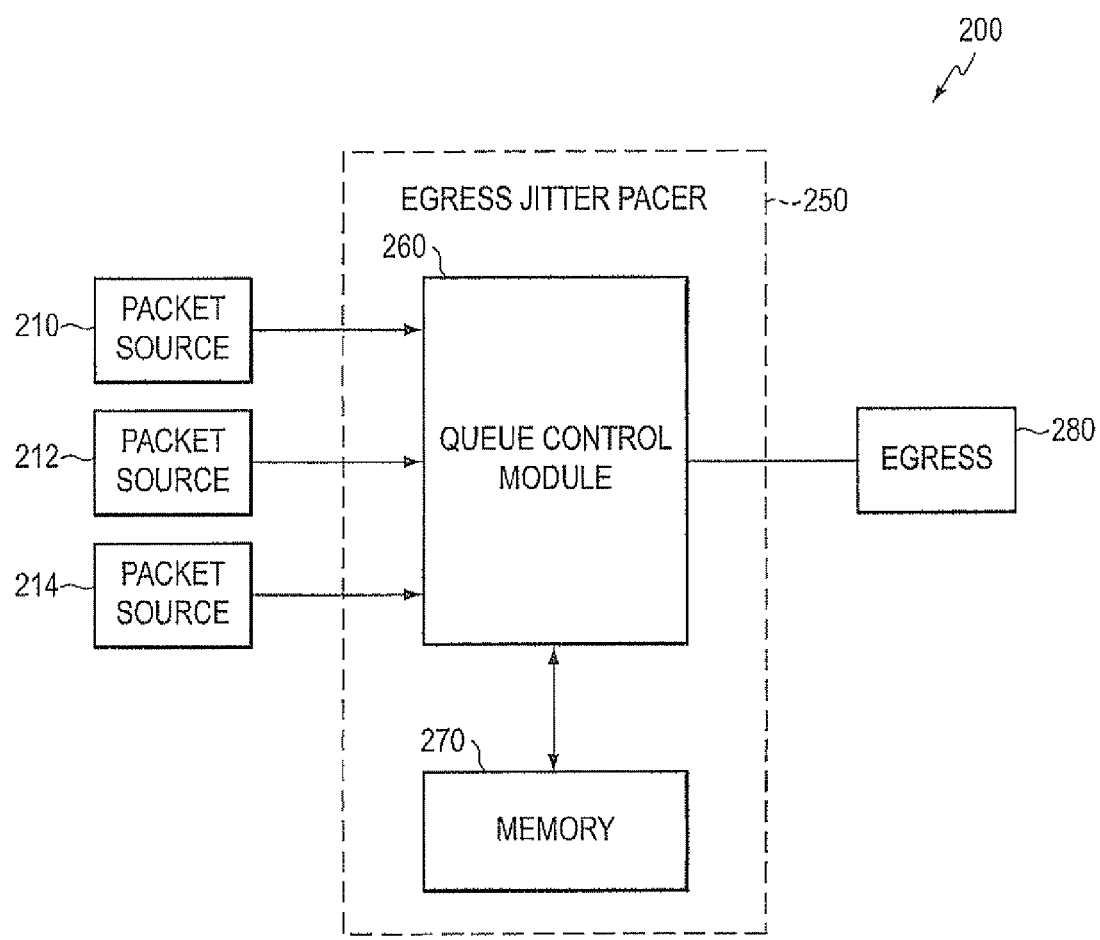
FIG. 2 shows a block diagram of an exemplary media source device.

FIG. 2 shows a block diagram of an exemplary media device according to the disclosure. The media device 200 may include various packet sources 210-214, an egress jitter pacer 250, and an egress port 280. These elements can be coupled together as shown in FIG. 2.

The packet sources 210-214 may include various components, such as suitable hardware components, suitable software components, suitable combinations of hardware and software components, and the like, that can generate a sequence of packets. For example, the packet source 210 may include a memory device that can store digital movies. A digital movie can be provided to the egress jitter pacer 250 as a sequence of packets.

In another example, the packet source 212 may include a digital video camera that may continually capture digital images, encode and compress the captured digital images into a video stream, for example according to a motion pictures expert group (MPEG) standard, and convert the video stream into a sequence of packets. For another example, the packet source 214 may include a software application that can generate a packet stream according to an algorithm, for example.

It is noted that the packet sources 210-214 may include media sources or non-media sources. The media sources may include a digital movie source, a video stream source, and the like. The non-media sources may include an email application, an FTP application, and the like.

The egress port 280 can receive a packet from the egress jitter pacer 250, and can transmit the packet to a communication link. For example, the egress port 280 may include an Ethernet interface that can couple the egress port 280 to a network via an Ethernet wire. The egress port 280 may transmit the packet to the network via the Ethernet wire. In another example, the egress port 280 may include an RF transmitter that can transmit a RF signal based on the packet.

The egress jitter pacer 250 may receive packets from various packet sources 210-214. The packets can be put into queues according to attributes of the packets. Specifically, the packets can be queued per class, per flow, per stream, and the like. For example, the packets can be grouped and queued according to an isochronous high-priority (ISO-Hi) class, an isochronous low-priority (ISO-Lo) class, an anisochronous high-priority (ANISO-Hi) class, and an anisochronous low-priority (ANISO-Lo) class. In another example, the packets can be queued per stream, such as a video conference stream, a HDTV movie stream, an FTP packet stream, and the like.

A queue may be specified by a transmission profile, or a plurality of parameters, such as bandwidth, priority and the like. Generally, a bandwidth may be assigned to a queue based on packet stream bandwidth, such as class bandwidth, stream bandwidth, or flow bandwidth. A priority may be assigned to a queue based on packet stream time sensitivity. Additionally, the parameters may be adjustable, for example by an administrator of the media device. For example, a queue for a regular video conference stream may be specified by a 0.4 Mbps bandwidth and a medium priority; a queue for a military video conference may be specified by 0.4 Mbps bandwidth and a high priority; a queue for HDTV movie stream may be specified by a 35 Mbps bandwidth and a low priority; and a queue for an FTP packet stream may be specified by a low priority.

In another example, a queue for an ISO-Hi class may be specified by a first bandwidth and a high priority; a queue for an ISO-Lo class may be specified by a second bandwidth and a low priority; a queue for an ANISO-Hi class may be specified by a high priority; and a queue for an ANISO-Lo class may be specified by a low priority. Additionally, isochronous traffic, such as a sum of the first bandwidth and the second bandwidth in the above example, may be limited, for example to no more than 75% of a total bandwidth of the egress port 280.

The egress jitter pacer 250 can schedule packet transmitting based on the transmission profiles or the plurality of parameters of the queues. For example, the egress jitter pacer 250 may transmit packets in the ISO-Hi queue in a distributive way over time based on the specified bandwidth of the queue. Specifically, the egress jitter pacer 250 may pace packets in the ISO-Hi queue, for example one packet in a time slot, to ensure a substantially precise amount of bytes from the ISO-Hi queue being sent out per time slot.

According to an embodiment of the disclosure, the egress jitter pacer 250 may include a queue control module 260 and a memory module 270 coupled together. The queue control module 260 can include queues that can queue headers of received packets. A header of a received packet may include a pointer to a memory location in the memory module 270 that stores the received packet. The queue control module 260 may determine an outgoing packet based on the headers in the queues. Further, the queue control module 260 may retrieve the outgoing packet from the memory module 260, and provide the outgoing packet to the egress port 280.

Figure 3:
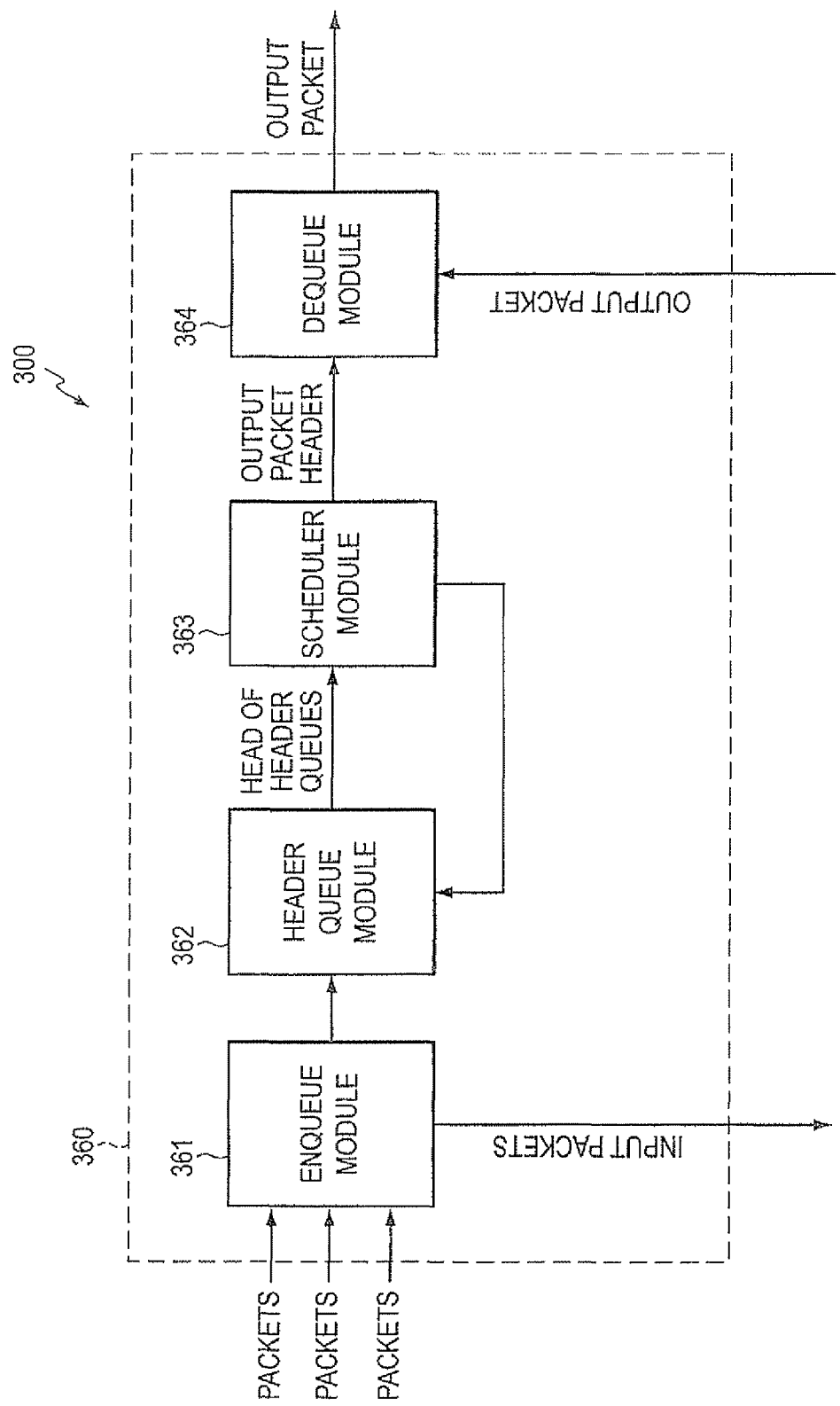
FIG. 3 shows a block diagram of an exemplary egress jitter pacer.

FIG. 3 shows a block diagram of an exemplary queue control module. The queue control module 300 may include an enqueue module 361, a header queue module 362, a scheduler module 363, and a dequeue module 364. These elements can be coupled as shown in FIG. 3.

The enqueue module 361 can retrieve a header of an incoming packet. Further, the enqueue module 361 may determine a queue for the incoming packet based on the header of the incoming packet. Then, the enqueue module 361 may store the incoming packet in a memory location, and update a pointer in the header to point to the memory location. In addition, the enqueue module 361 may queue the header into the determined queue. In an embodiment, enqueue module 361 may detect a start of a sequence of packets, such as a new stream of packets, a new flow of packets, and the like, based on an incoming packet. The enqueue module 361 may assign a queue for the sequence of packets, and may assign transmission profile or one or more parameters to the queue based on the incoming packet.

The header queue module 362 may include queues that can be specified to queue headers of incoming packets. A queue can be specified to queue a sequence of packets, such as a class of packets, a stream of packets, a flow of packets, and the like. For example, the header queue module 362 may include a queue specified for an ISO-Hi class, a queue specified for an ISO-Lo class, a queue specified for an ANISO-Hi class, and a queue specified for an ANISO-Lo class.

The header queue module 362 may provide heads of the queues to the scheduler module 363. In addition, the header queue module 362 may receive information from the scheduler module 363 to update the queues. For example, the header queue module 362 may receive information indicative of a queue from which the outgoing packet comes, thus the header queue module 362 may update the queue, for example by updating a head pointer.

The scheduler module 363 can receive heads of the queues from the header queue module 362. The scheduler module 363 may determine an outgoing packet based on transmission profiles, or the one or more parameters specified to the queues. More specifically, the scheduler module 363 may determine a time to output a packet from a time sensitive queue, such as an isochronous queue, based on a bandwidth of the queue. Therefore, packets from the isochronous queue can be paced to ensure a substantially equal amount of data being transmitted at each time interval. Additionally, the scheduler module 363 may determine if outputting a packet from a less time sensitive queue, such as an isochronous queue with a lower priority, or an anisochronous queue, may affect pacing the time sensitive queue, and may respond accordingly to ensure the substantially equal amount of data can be transmitted at each time interval for the time sensitive queue.

Further, the scheduler module 363 may provide the header of the determined outgoing packet to the dequeue module 364. In addition, the scheduler module 363 may provide information to the header queue module 362 to update the queues.

The dequeue module 364 may receive the header of the determined outgoing packet, and retrieve the outgoing packet from a memory location based on the pointer in the header. Further, the dequeue module 364 may provide the packet to the egress port.

Figure 4:
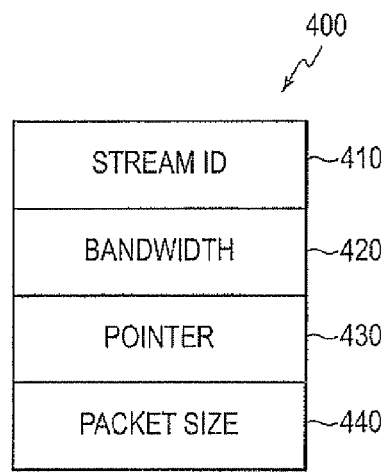
FIG. 4 shows an exemplary packet header.

FIG. 4 shows a diagram of an exemplary implementation of a header for a packet. The header 400 may include various fields, such as a stream identification field 410, a bandwidth field 420, a pointer field 430, a packet size field 440, and the like.

The stream identification field 410 may include an identification for a packet stream, to which the packet belongs. The pointer field 430 may include a pointer pointing to a memory location that stores the packet. The bandwidth field 420 may include information that is indicative of bandwidth specified for the packet stream. The packet size field 440 may include a number that is indicative of the packet size, such as a number of bytes.

It is noted that information can be explicitly included in the header or can be implicitly induced from the header. For example, a header may include a packet interval and a packet size instead of a bandwidth and the packet size. The packet interval may specify a time interval between adjacent packets for a packet stream. The bandwidth may be determined by the packet size and the packet interval.

Figure 5:
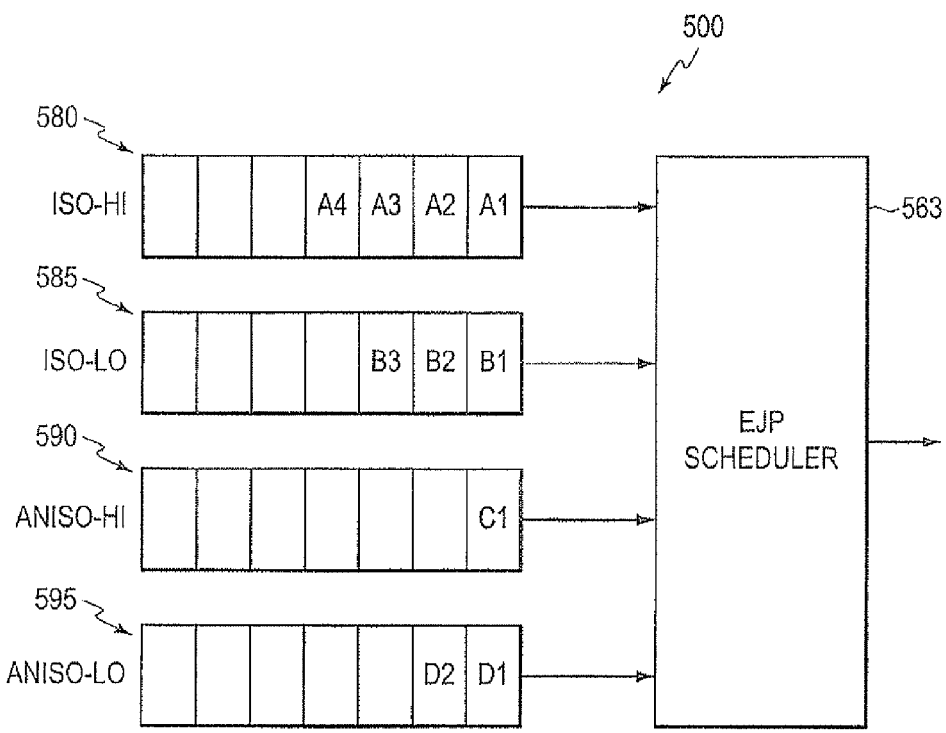
FIG. 5 shows a block diagram of an exemplary scheduler scheduling packet transmission from a plurality of queues.

FIG. 5 shows a block diagram example of a scheduler module 563 coupled to a plurality of queues according to an embodiment of the disclosure. The plurality of queues may include an ISO-Hi queue 580, an ISO-Lo queue 585, an ANISO-Hi queue 590, and an ANISO-Lo queue 595. Each queue may be specified by a plurality of parameters. For example, the ISO-Hi queue 580 may be specified by a 0.4 Mbps bandwidth and a high priority, the ISO-Lo queue 585 may be specified by a 40 Mbps bandwidth and a low priority, the ANISO-Hi queue 590 may be specified by a high priority, and the ANISO-Lo queue 595 may be specified by a low priority.

Each queue may queue a sequence of packets. For example, the ISO-Hi queue 580 may include packets A1-A4, the ISO-Lo queue 585 may include packets B1-B3, the ANISO-Hi may include a packet C1, and the ANISO-Lo may include packets D1-D2. The plurality of queues may provide heads, such as A1, B1, C1, and D1, to the scheduler module 563. The scheduler module 563 may determine an outgoing packet from the heads based on the plurality of parameters specified to the queues.

In an embodiment, the scheduler module 563 may utilize token bucket techniques to determine an outgoing packet. The scheduler module 563 may assign a token bucket to the egress port. The egress token bucket may be assigned an egress token rate and an egress token limit. The egress token rate may be assigned based on the egress bandwidth. For example, the egress token rate may be equivalent to the egress bandwidth. The egress token rate may indicate an increase rate for the egress token bucket. The egress token limit may indicate a token threshold for the egress to transmit a packet. Additionally, when the egress sends a packet, a number of tokens corresponding to the packet size can be subtracted from the egress token bucket.

Additionally, the scheduler module 563 may assign a queue token bucket to each queue. For example, the ISO-Hi queue may be assigned an ISO-Hi token bucket, the ISO-Lo queue may be assigned an ISO-Lo token bucket, the ANISO-Hi queue may be assigned an ANISO-Hi token bucket, and the ANISO-Lo queue may be assigned an ANISO-Lo token bucket. Similar to the egress token bucket, each queue token bucket may be assigned a queue token rate and a queue token limit. The queue token rate may be assigned based on the bandwidth of the queue. The queue token rate may indicate an increase rate for the queue token bucket. The queue token limit may indicate a token threshold enabling the queue to output a packet. Additionally, when an outgoing packet comes from a queue, a number of tokens corresponding to the outgoing packet size can be subtracted from the queue token bucket of the queue.

During operation, the egress token bucket and the queue token buckets may increase tokens by the token rate assigned. The scheduler module 563 may observe the token buckets to determine an outgoing packet. At an observation time, the scheduler module 563 may observe the egress token bucket to determine if the egress token bucket reaches the egress token limit for sending a packet. When the egress token bucket does not reach the egress token limit, the scheduler module 563 may wait for a next observation time.

When the egress token bucket reaches the egress token limit, the scheduler module 563 may observe the queue token buckets to determine a queue for sending an outgoing packet. Specifically, the scheduler module 563 may observe the queue token buckets to determine if a queue token bucket reaches corresponding queue token bucket limit for outputting a packet.

Additionally, the scheduler module 563 may prioritize the queue token buckets according to the priorities of the queues. For example, the scheduler module 563 may prioritize the queue token buckets following the ISO-Hi token bucket, the ISO-Lo token bucket, the ANISO-Hi token bucket, and ANISO-Lo token bucket.

Further, the scheduler module 563 may look ahead to determine if sending a packet from a lower priority queue affects pacing of a higher priority queue. For example, after the scheduler module 563 observes that the ISO-Hi token bucket does not have enough tokens to send a packet, the scheduler module 563 may check the ISO-Lo token bucket. When the ISO-Lo token bucket reaches the ISO-Lo token limit, the scheduler module 563 may further determine if sending out a packet from the ISO-Lo queue affects pacing the ISO-Hi queue. In an embodiment, the scheduler module 563 may determine if the ISO-Hi token bucket can accumulate enough tokens during the time sending a packet from the ISO-Lo queue. If sending a packet from the ISO-Lo queue affects pacing the ISO-Hi queue, the scheduler module 563 may send a packet from the ISO-Hi queue instead of the ISO-Lo queue.

Figure 6:
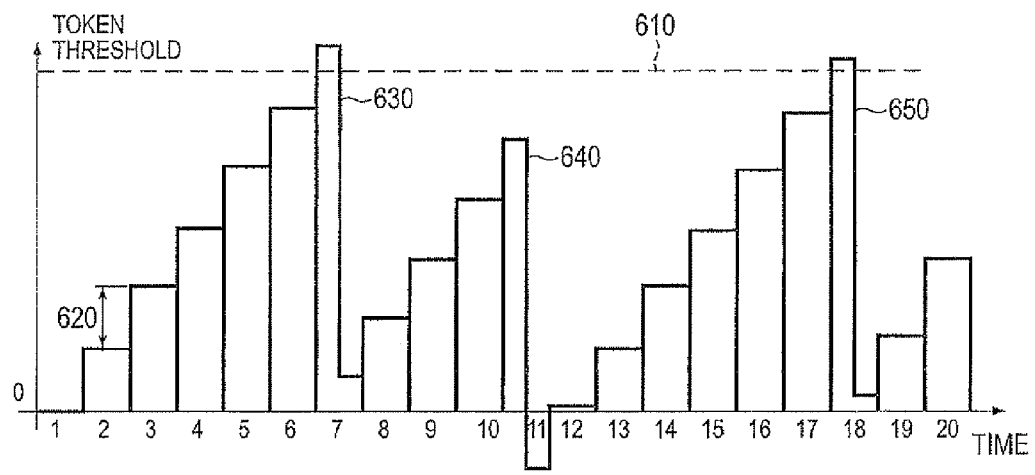
FIG. 6 shows an exemplary scenario of a token bucket example.

FIG. 6 shows an exemplary scenario of a token bucket example for a queue. The token bucket can be used by a scheduler to determine a time to send a packet from the queue. The token bucket may have assigned parameters, such as a token rate, a token limit, and the like. The token rate may determine a number of token increase per time unit, such as indicated by 620. The token rate can be assigned based on a bandwidth of a packet stream. The token limit can determine a threshold that enables the queue to send out a packet.

When a packet has been sent out, a number of tokens corresponding to the packet size can be subtracted from the token bucket, such as shown by 630 and 650. Additionally, when the scheduler determines that sending a packet from a lower priority queue may affect pacing of the queue, a packet may be sent from the queue even though the token bucket does not have enough tokens, such as shown by 640. In such case, the token number in the token bucket may become negative after sending out the packet.

Figure 7:
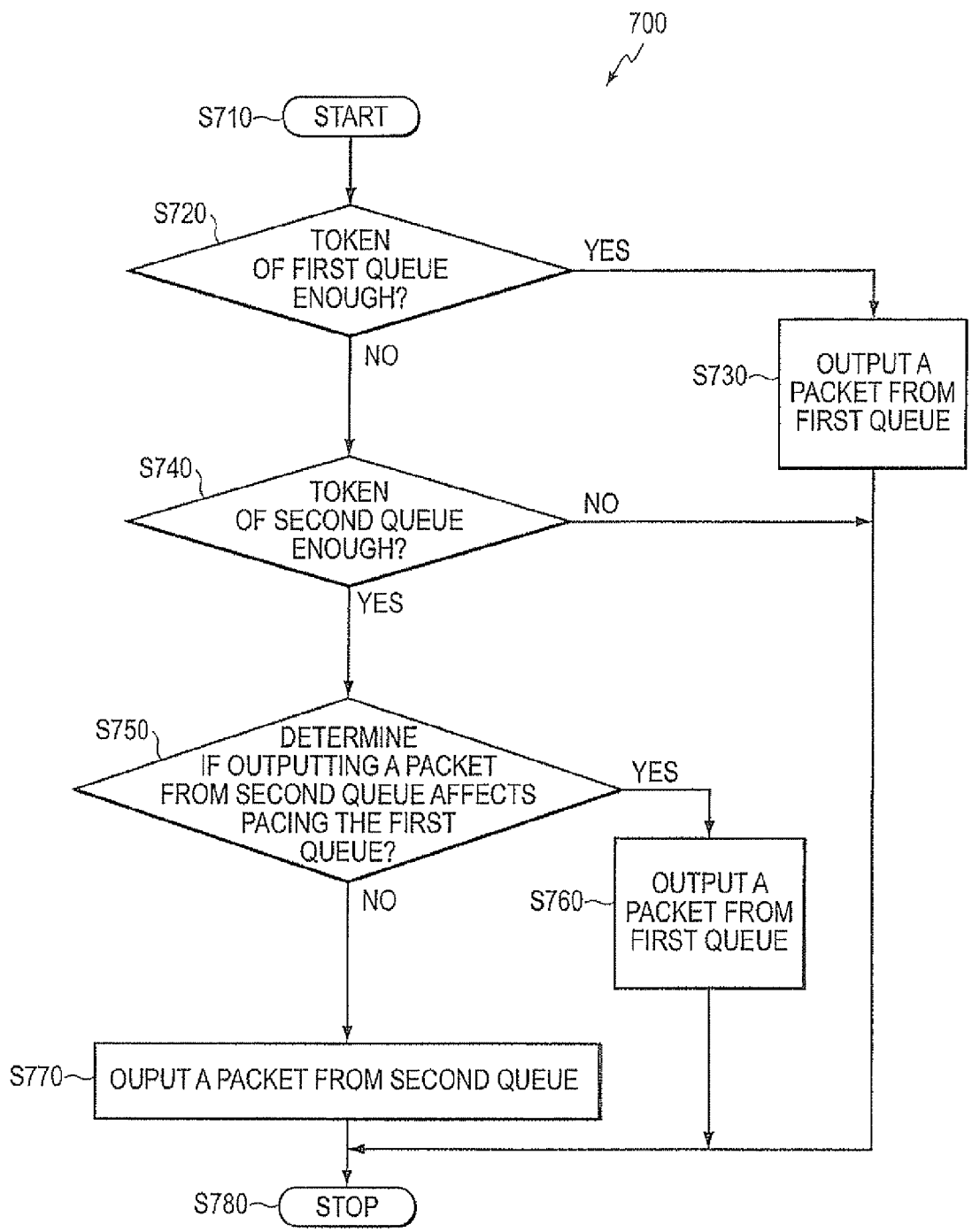
FIG. 7 shows a flowchart outlining an exemplary scheduling process.

FIG. 7 shows a flow chart outlining an exemplary scheduling process for determining an outgoing packet from queues at a given observation time based on token buckets. At an observation time, the scheduling process starts at step S710, and proceeds to step S720.

In step S720, the process may determine if a first queue, such as a high priority isochronous queue, has enough tokens to send an outgoing packet. When the first queue has enough tokens, the process proceeds to step S730, otherwise the process proceeds to step S740.

In step S730, the process may output a packet, such as the head packet, from the first packet queue. Then, the process proceeds to step S780 and terminates.

In step S740, the process may determine if the second queue, such as a low priority isochronous queue, an anisochronous queue, and the like, has enough tokens to output a packet. When the second queue has enough tokens, the process proceeds to step S750, otherwise, the process proceeds to step S780 and terminates.

In step S750, the process may determine if outputting a packet from the second queue affects pacing of the first queue. When the pacing of the first queue can be affected, the process proceeds to step S760, otherwise, the process proceeds to step S770.

In step S760, the process can output a packet from the first queue even though the first queue does not have enough tokens. Therefore, the process can ensure a substantially equal number of bytes transmitted from the first queue in each time interval. Then, the process proceeds to step S780 and terminates.

In step S770, the process can output a packet from the second queue. Then, the process proceeds to step S780 and terminates.

For ease and clarity, the disclosed scheduling process is presented with a first queue and the second queue. However, the process can be suitably adjusted to determine an outgoing packet from more than two queues.

Figure 8:
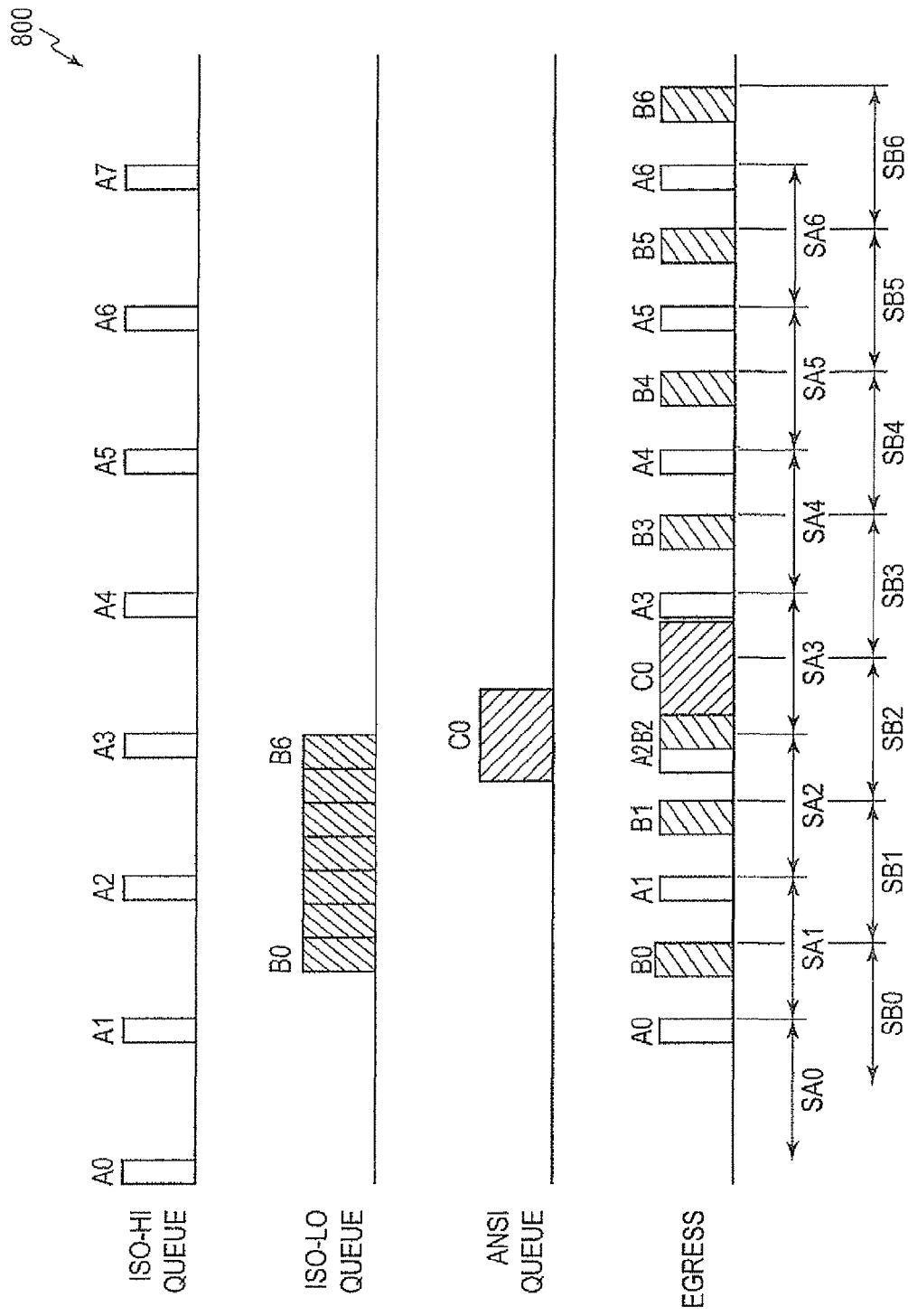
FIG. 8 shows a timing diagram of an exemplary packet scheduling for an egress.

FIG. 8 shows a timing diagram of an exemplary packet scheduling for an egress port. The egress port may multiplex packets from an ISO-Hi queue, an ISO-Lo queue, and an ANISO queue. In the example, the ISO-Hi queue may queue packets from a video conference that can be time sensitive. The ISO-Hi queue may receive packets, such as A0-A7, according to a bandwidth of the video conference. The packets A0-A7 can be transmitted by the egress port according to the video conference bandwidth. The ISO-Lo queue may queue packets from a digital movie server, for example. The ISO-Lo queue may receive digital movie packets on availability, such as B0-B6. The digital movie packets B0-B6 can be transmitted by the egress port according to a digital movie playing bandwidth or data rate. The ANISO queue may queue packets that are not time sensitive, such as from an email application. A packet in ANISO queue, such as C0, may have a size according to a maximum transport unit (MTU).

According to the disclosure, an egress jitter pacer may schedule packet transmission from the ISO-Hi queue at a pace, such as transmitting a packet at end of each time slot SA0-SA6. Additionally, the egress jitter pacer may schedule packet transmission from other queues, such as ISO-Lo and ANISO queues. Further, the egress jitter pacer may determine if the packet transmission from other queues may interfere the packet transmission pace of the ISO-Hi queue. For example, in time slot SA2, if the C0 packet from the ANISO queue is transmitted before the A2 packet from the ISO-Hi queue, due to the large size of the C0 packet, the A2 packet may be not able to be transmitted within the time slot SA2, which may result in no packet from the ISO-Hi queue being transmitted in the time slot SA2. The egress jitter pacer may determine to transmit the A2 packet ahead of schedule, before transmitting the C0 packet in order to ensure transmitting one packet per time slot SA0-SA6. Similarly, the egress jitter pacer may determine to transmit B2 ahead of schedule before transmitting the C0 packet in order to ensure transmitting one packet per time slot SB0-SB6.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A device, comprising:
   a first queue configured to queue a sequence of packets for transmission from an egress port to a receiving device; and
   a queue control module configured to schedule the sequence of packets in time slots of the egress port, the packets being included in the time slots of the egress port, such that the packets are uniformly distributed across the time slots and transmission of the sequence of packets satisfies an agreed data rate between the device and the receiving device, the queue control module further configured to transmit a packet from the sequence of packets of the first queue by delaying transmission of a packet from a second queue configured to queue a sequence of packets having different priority than the packets queued in the first queue for transmission from the egress port to the receiving device when the transmission of the packet from the second queue, in absence of delay, hinders the uniform distribution of packet transmission from the first queue, the queue control module further configured to transmit the packet from the first queue even when the transmitting the packet causes the first queue to exceed a token limit of a token bucket of the first queue only when outputting a packet from the second queue affects the uniform distribution of packet transmission from the first queue.

2. The device according to claim 1, further comprising:
   the second queue configured to queue at least one packet, wherein the queue control module is further configured to schedule a packet from the first queue before a packet from the second queue for transmission in a time slot of the egress port in order to ensure the packet from the first queue is transmitted in the time slot.

3. The device according to claim 1, wherein the queue control module is further configured to shape transmission rate from the first queue based on an agreed transmission profile.

4. The device according to claim 1, wherein the queue control module further comprises:
   a token bucket configured to store a number of tokens, and the queue control module is further configured to update the number of tokens in the token bucket based on the agreed data rate.

5. The device according to claim 4, wherein the queue control module is further configured to determine a packet transmission from the first queue based on comparing the number of tokens in the token bucket to a token limit.

6. The device according to claim 4, wherein the queue control module is configured to increase the number of tokens by a token rate.

7. The device according to claim 6, wherein a number of tokens corresponding to a size of a packet is subtracted from the token bucket when the packet is transmitted.

8. The device according to claim 1, wherein the sequence of packets corresponds to a media stream.

9. The device according to claim 1, wherein the device is used for providing media data as a part of a network media system, the network media system comprising:
   the receiving device for playing the media data; and
   a network communication channel configured to provide a channel to transmit the media data from the device to the receiving device.

10. The device according to claim 1, wherein the uniform distribution of packet transmission from the first queue ensures transmission of one packet from the first queue per each of first time slots allocated for the first queue.

11. A method for outputting a sequence of packets, comprising:
   queuing a sequence of packets into a first queue for transmission from an egress port to a receiving device;
   scheduling the sequence of packets in time slots of the egress port, such that the packets are uniformly distributed across the time slots, and transmission of the sequence of packets satisfies an agreed data rate between a media source and the receiving device;
   delaying transmission of a packet from a second queue configured to queue a sequence of packets having different priority than the packets queued in the first queue for transmission from the egress port to the receiving device in order to transmit a packet from the sequence of packets of the first queue when the transmission of the packet from the second queue, in absence of delay, hinders the uniform distribution of packet transmission from the first queue; and transmitting the packet from the first queue even when the transmitting the packet causes the first queue to exceed a token limit of a token bucket of the first queue only when outputting a packet from the second queue affects the uniform distribution of packet transmission from the first queue.

12. The method according to claim 11, further comprising:
queuing at least one packet in the second queue for transmission from the egress port; and
scheduling a packet from the first queue before a packet from the second queue for transmission in a time slot of the egress port in order to ensure the packet from the first queue is transmitted in the time slot.

13. The method according to claim 11, further comprising determining a transmission time in a time slot for the egress port to transmit a packet of the sequence of packets.

14. The method according to claim 13, wherein determining the transmission time further comprises:
updating a number of tokens in a token bucket with a token rate based on the agreed data rate; and
determining the transmission time based on the number of tokens in the token bucket.

15. The method according to claim 14, wherein determining the transmission time further comprises:
comparing the number of tokens in the token bucket to a token limit.

16. The method according to claim 14, further comprising:
determining the transmission time based on the number of tokens in the token bucket and a potential pace interfering packet, which belongs to a lower class of service than the sequence of packets, and is queued for transmission from the egress port.

17. A device, comprising:
a first queue with a first transmission profile;
a second queue with a second transmission profile;
a queue control module configured to schedule respective packets from the first queue and the second queue for transmission from an egress port, and check the first transmission profile of the first queue before transmitting a packet from the second queue, the queue control module further configured to transmit a packet from the first queue by delaying transmission of a packet from the second queue configured to queue a sequence of packets having different priority than the packets queued in the first queue for transmission from the egress port to a receiving device when the transmission of the packet from the second queue, in absence of delay, hinders the uniform distribution of packet transmission from the first queue, the queue control module further configured to transmit the packet from the first queue even when the transmitting the packet causes the first queue to exceed a token limit of a token bucket of the first queue only when outputting a packet from the second queue affects the uniform distribution of packet transmission from the first queue.

18. The device according to claim 17, wherein the first and the second transmission profiles include at least one of a bandwidth and a priority.

19. The device according to claim 17, wherein packets are queued into the first queue and the second queue based on one or more of a plurality of criteria.

20. The device according to claim 19, wherein the plurality of criteria include at least one of class, flow and stream.

21. The device according to claim 17, wherein at least one of the first and the second transmission profiles are adjustable.

22. The device according to claim 17, wherein in response to checking the first transmission profile of the first queue, the packet from the second queue is not scheduled for transmission if such scheduling has an adverse impact on the first queue.

23. A method for outputting a sequence of packets, comprising:
queuing packets into a first queue with a first transmission profile;
queuing at least one packet into a second queue with a second transmission profile;
scheduling packet transmissions from the first queue and the second queue based on the first and the second transmission profiles;
checking the first transmission profile of the first queue before transmitting a packet from the second queue;
delaying transmission of a packet from the second queue in order to transmit a packet from the first queue when the transmission of the packet from the second queue configured to queue a sequence of packets having different priority than the packets queued in the first queue for transmission from an egress port to a receiving device, in absence of delay, hinders the uniform distribution of packet transmission from the first queue; and
transmitting the packet from the first queue even when the transmitting the packet causes the first queue to exceed a token limit of a token bucket of the first queue only when outputting a packet from the second queue affects the uniform distribution of packet transmission from the first queue.

24. The method according to claim 23, wherein the first and the second transmission profiles include at least one of a bandwidth and a priority.

25. The method according to claim 23, wherein queuing packets into the first queue and the second queue is based on one or more of a plurality of criteria.

26. The method according to claim 25, wherein the plurality of criteria include at least one of class, flow and stream.

27. The method according to claim 23, wherein at least one of the transmission profiles are adjustable.

* * * * *